United States Patent [19]
Rhody

[11] 3,814,461
[45] June 4, 1974

[54] CONCEALED TIE DOWN ANCHOR

[76] Inventor: Howard A. Rhody, 9312 Torrey St., Grand Blanc, Mich.

[22] Filed: Mar. 5, 1973

[21] Appl. No.: 338,108

Related U.S. Application Data

[63] Continuation-in-part of Ser. No. 193,781, Oct. 29, 1971, Pat. No. 3,722,911.

[52] U.S. Cl. .......................... 280/179 R, 248/361 R
[51] Int. Cl. .............................................. B60p 7/00
[58] Field of Search .................... 280/179 A, 179 R; 105/369 A; 248/361 A, 361 R

[56] References Cited
UNITED STATES PATENTS

| | | | |
|---|---|---|---|
| 2,856,865 | 10/1958 | Reynolds | 105/369 A |
| 3,298,652 | 1/1967 | Burdick | 280/179 R |
| 3,709,156 | 1/1973 | Bowers | 105/369 A |

Primary Examiner—Robert R. Song
Attorney, Agent, or Firm—Andrew R. Basile

[57] ABSTRACT

A tie down anchor mounted on a vehicle and adapted to facilitate the lashing down of a load carried by the vehicle. The tie down anchor has a housing with an opening extending through one wall of the housing. The housing is fastened to the interior wall surface of an exposed body portion of the vehicle such that the housing opening is aligned with a second opening extending through the vehicle body portion. An anchor movably secured to the inner wall of the housing opposite the housing opening is movable between a first position wherein the anchor projects outwardly through the body portion for attachment to a cable to facilitate the lashing down of the load carried by the vehicle and a second position wherein the anchor is retracted within the opening and positioned against the inner wall of the housing. A cover member having an exterior finish complementary to the exterior finish of the exposed body portion is movable between a first position within the housing wherein the cover extends through the housing opening and encloses the body portion opening and a second position wherein the cover is laterally moved within the housing to expose the anchor. Means are provided for biasing the cover outwardly while second means carried by the cover limit such outward movement.

9 Claims, 4 Drawing Figures

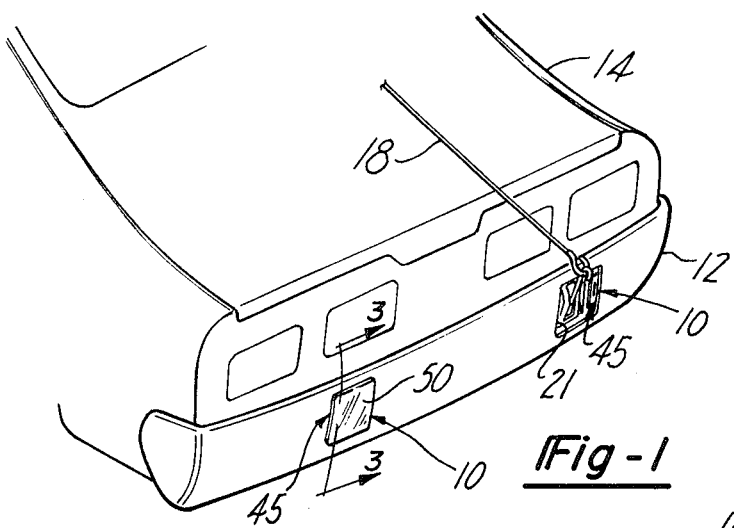
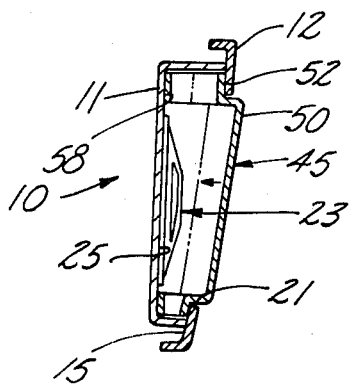
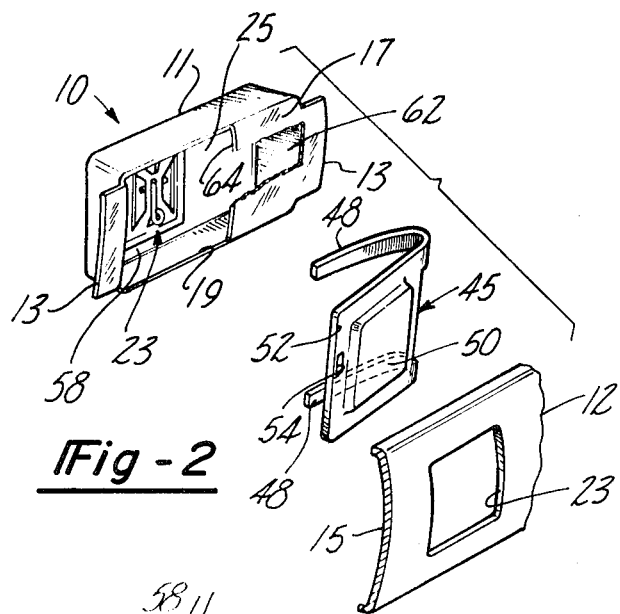
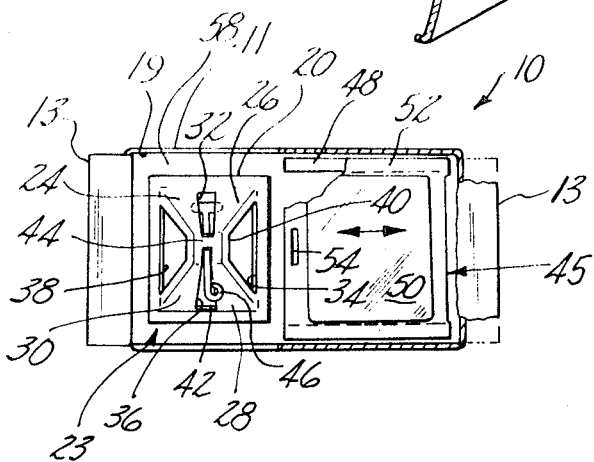

CONCEALED TIE DOWN ANCHOR

CROSS REFERENCE TO RELATED APPLICATIONS

The present application is a continuation in part of co-pending U.S. Pat. application Ser. No. 193,781 filed Oct. 29, 1971, now U.S. Pat. No. 3,722,911, for "Tie Down Anchor."

BACKGROUND OF THE INVENTION

1. Field of the Invention

The present invention relates to tie down anchors, and, more particularly to a concealed tie down anchor for securing a load carried by automobiles and similar vehicles.

2. Description of the Prior Art

It has become quite customary for many individuals to transport goods on racks or similar containers mounted to the top of an automobile or similar vehicles and it is important to insure that the load is secured in place to avoid damage to the load or to the carrier in the event that the load should fall from the carrier while the same is in motion. It has been a customary practice to secure such loads to the tops of automobiles by means of straps or ropes extended between the load and the automobile bumpers. Such a manner of tying down the load has not been satisfactory in all circumstances, and, particularly, since the sharp corners of the bumpers tend to cut into the rope or strap, there is a substantial danger of the strap or rope breaking while the automobile is in motion.

Although tie down anchors are well known, they are not adaptable for use on automobiles as they tend to detract from the appearance of the automobile. It would therefore be highly desirable to provide a tie down anchor with means for concealing the anchor in a manner which does not take away from the overall appearance of the automobile.

SUMMARY OF THE INVENTION

The present invention which will be described subsequently in greater detail comprises a tie down anchor particularly adapted for mounting on passenger vehicles and the like and comprising a housing mounted to the inner wall of an exposed vehicle body portion, such as a bumper. The housing carries an anchor which is extendable through an opening in the housing which, in turn, is aligned with an opening in the vehicle body portion to facilitate the securing of a load carried by the vehicle. The anchor is retractable within the housing and concealed by a cover member carried by the housing with the vehicle body portion to enclose the body opening. The cover has an exterior finish complementary to the exterior finish of the body portion.

It is therefore an object of the present invention to provide a new and improved concealed tie down anchor particularly adapted for use on passenger vehicles.

It is also an object of the present invention to provide a tie down anchor which is durable and rugged, which may be manufactured at a relatively low cost, quickly and inexpensively installed, and which does not take away from the overall appearance of the vehicle.

Other objects, advantages, and applications of the present invention will become apparent to those skilled in the art of tie down anchors when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and in which:

FIG. 1 is a fragmentary perspective view of an automobile having several tie down anchors constructed in accordance with the principles of the present invention;

FIG. 2 is an exploded perspective view of one of the tie down anchors illustrated in FIG. 1;

FIG. 3 is a fragmentary, cross-sectional view of the tie down anchor taken along line 3—3 of FIG. 1; and FIG. 4 is a fragmentary, front elevational view of the tie down anchor illustrated in FIG. 2 with the tie down anchor in a stored position.

DESCRIPTION OF THE PREFERRED EMBODIMENT

Referring now to the drawing and, in particular, to FIG. 1 wherein there is illustrated a pair of tie down anchors 10 constructed in accordance with the principles of the present invention and mounted to the rear bumper 12 of an automobile 14 for lashing a load (not shown) to the top of the automobile 14 by means of fastening lines 18 (only one of which is shown) secured to the anchors 10 and load.

The tie down anchor 10 comprises a housing 11 which is rectangular in shape in one plane and trapazoidally shaped in a perpendicular plane (FIG. 3). The housing 11 has on its front face a pair of outwardly extending flanges 13 which facilitate the attachment of the housing 11 to the inner surface 15 of the vehicle bumper 12. The housing may be attached by any suitable means such as by welding, threaded fasteners, and adhesive or the like. An opening 19 is formed in a wall 17 of the housing 11 and when the housing 11 is attached to the wall 15 of the bumper 12, the opening 19 is aligned with an opening 21 extending through the bumper to facilitate access to an anchor assembly 23.

The tie down anchor assembly 23 comprises a support plate 20 which may be an integral component of the rear wall 25 of the housing 11. The front face of the plate 20 protrudes outwardly in a spider-like configuration 22 formed by a plurality of outwardly inclined retaining arms 24, 26, 28 and 30 between which are respectively formed openings 32, 34, 36 and 38. The extended ends of the retaining arms are integrally joined to form a base section 40. The lower opening 36 terminates in a vertically disposed elongated slot 42 having parallel side walls, and which is separated from the upper opening 32 by a cross member 44. The spider-like configuration 22 is adapted to support an anchor 46 when it is desired to lash the load down as described in greater detail in the aforementioned patent application.

The anchor 46 comprises a non-circular shaft portion such as a rectangular cross section complementary to the slot 42. The shaft portion has a semi-spherically shaped ball at the inner end and a tie on hook at its outer end. The shaft and the hook of the anchor 46 are adapted to project through the slot 42 when the anchor 46 is in use with the complementary shaped shaft portion mating with the slot 42 to prevent rotational movement of the anchor 46 so that the hook projects outwardly as illustrated in FIG. 1 while the cross member 44 limits the upward movement of the anchor 46. When the anchor 46 is not in use, the same is displaced downwardly from the slot 42 into the larger lower opening 36 and the entire anchor 46 is placed in an upright position for storage, as illustrated in FIG. 4.

As can best be seen in FIG. 2, the tie down anchor 10 further comprises a cover 45 which is rectangular in shape having a pair of inwardly bent ends forming leaf-type springs 48 for a purpose to be described hereinafter. The cover 45 has a central raised section 50, the outer periphery of which is shaped to be received within and extend slightly through the bumper opening 21 to enclose the same when positioned and aligned therewith as to be described. The peripheral edge 52 of the cover 45 engages the inner wall 15 of the bumper to limit the outward movement of the cover 46 through the opening 21 under the bias of the leaf springs 48. The edge 52 is provided with a slot 54 (FIG. 2) to permit the user to insert a key or a screwdriver end therein to facilitate movement of the cover 45 as will be described. A tab 56 provided on the inside surface of the cover 45 provides a similar function. The inner wall surface of the housing 11 above and below the tie down anchor assembly 23 forms a pair of tracts 58 on which the leaf-type springs 48 are positioned and on which the same slidably move as the cover 45 is manually moved to a first position above anchor assembly 23 wherein the springs 48 bias the cover 45 outwardly so that the raised section 50 extends through the bumper opening 21 to a second position wherein the user presses or retracts the cover 45 inwardly into the housing 11 and slides the cover 45 on the tracts 58 into a cavity 62 and releases the same such that the cover 45 is biased against the inner surface 64 of the housing wall 17.

The inner surface 64 of the housing wall 17 may be coated with a protective coating such as teflon to prevent damage to the exterior surface of the raised center section 50 of the cover 45 as the raised center section 50 has its exterior surface finished to be complementary to the exterior surface of the body portion of the vehicle on which it is attached and in the present embodiment the finish would be chrome plated to be complementary to the chrome plated surface of the bumper 15. It should be understood by those skilled in the art of such anchors that the present invention may be attached to other portions of the vehicle body such as the fender, hood, or rear deck of the vehicle whereupon the finish of the cover 45 may have a painted surface or the like so as to be complementary to the body portion on which it is attached.

When the tie down anchor 46 is in use and the cover 45 has been laterally moved within the cavity 62, the tie down anchor 46 may be removed and utilized in the manner illustrated in FIG. 1 and as aforementioned. When the tie down anchor 46 is not in use, the anchor 46 is positioned under the assembly 23 as aforementioned and the user may grasp the tab 56 or insert a key into the slot 54 to slide the cover 45 from within the cavity 62 and over the tie down anchor assembly 23 to conceal the same while the leaf-type springs 48 bias the cover 45 outwardly until the raised center section 50 projects through the housing opening 19 and the bumper opening 21. The outward movement of the cover 45 is restrained by the engagement of the peripheral edge 52 of the cover 45 with the inside wall surface 15 of the bumper 12, as aforementioned.

It can thus be seen that the present invention has provided a new and improved tie down anchor adapted for use on automobiles and, in particular, automobile bumpers. The tie down anchor is designed such that it is durable and rugged in construction, may be manufactured at a relatively low cost and quickly and inexpensively installed on an automobile or the like.

It can also be seen that the present invention provides a tie down anchor which due to its unique design will not detract from the overall appearance of the automobile when the same is not employed to lash down a load carried by the automobile as the tie down anchor is concealed within a body portion of the automobile and the cover which permits access to the anchor is simply and easily stored during the use of the tie down anchor and within the tie down anchor housing itself, yet can be simply and easily moved to a position where it conceals the tie down anchor while at the same time being complementary with the exterior portion of the vehicle.

Although only one embodiment of the present invention has been disclosed, it should be understood by those skilled in the art that other forms and modifications may be made without departing from the spirit of the invention or scope of the appended claims.

What is claimed is as follows.

1. A tie down anchor mounted on a vehicle, said tie down anchor comprising:
a housing having an opening extending through a wall of said housing;
fastening means for attaching said housing to the inner surface of an exposed body portion of said vehicle, said vehicle body portion having an opening extending therethrough, said housing opening being aligned with said body portion opening when fastened to said inner surface of said exposed body portion;
an anchor;
means movably securing said anchor to the inner wall of said housing opposite said housing opening such that said anchor is movable between a first position wherein said anchor projects outwardly through said body portion opening and a second position wherein said anchor is disposed behind said securing means; and
a cover laterally movably mounted in said housing between a first position wherein said cover extends through said housing opening and encloses said body portion opening and a second position wherein said cover exposes said anchor.

2. The tie down anchor defined in claim 1 wherein the exposed surface of said cover has an external finish complementary to the external surface of said vehicle exposed body portion.

3. The tie down anchor defined in claim 1 wherein the inner wall of said housing has a plurality of outwardly extending retaining arms joined to one another at their extended ends and defining an aperture through which said anchor projects when said anchor is in said first position, said joined ends of said retaining arms having an elongated opening extending downwardly from said aperture to permit said anchor to be displaced behind said retaining arms when in said second position.

4. The tie down anchor defined in claim 3 wherein said anchor comprises an elongated non-circular shaft portion having a rounded end and a hook-shaped end, said rounded end being disposed behind said retaining arms, said aperture having a configuration conforming to the configuration of said shaft such that said shaft is non-rotatable when disposed in said aperture.

5. The tie down anchor defined in claim 1 further comprising means biasing said cover outwardly of said housing opening and into said body portion opening and means carried by said cover to limit said outward movement of said cover.

6. The tie down anchor defined in claim 1 wherein said housing has a second wall opposite said first-mentioned wall, said cover being movable to said second position behind said second wall.

7. The tie down anchor defined in claim 6 wherein the exposed surface of said cover has an external finsih complementary to the finish of the external surface of said vehicle body portion and the inner surface of said second-mentioned wall of said housing being provided with a protective cover to prevent damage to said cover finish when said cover is laterally moved behind said second wall.

8. The tie down anchor defined in claim 1 wherein said vehicle exposed body portion is a vehicle bumper and the exposed surface of said cover has an external finish complementary to the exposed surface of said vehicle bumper.

9. The tie down anchor defined in claim 5 wherein said biasing means is an integral portion of said cover and movable therewith between said first and second positions.

* * * * *